United States Patent [19]

Baumoel

[11] Patent Number: 5,001,936

[45] Date of Patent: Mar. 26, 1991

[54] MOUNTING STRUCTURE FOR TRANSDUCERS

[76] Inventor: Joseph Baumoel, 155 Plane Ave., Hauppauge, N.Y. 11788

[21] Appl. No.: 365,364

[22] Filed: Jun. 13, 1989

[51] Int. Cl.$^5$ .............................................. G01F 1/66
[52] U.S. Cl. ............................... 73/861.18; 73/861.28
[58] Field of Search ........... 73/861.06, 861.18, 861.27, 73/861.28, 53

[56] References Cited

U.S. PATENT DOCUMENTS 4,425,803  1/1984  Baumodel ........................ 73/861.18
4,454,767  6/1984  Shinkai et al. ................... 73/861.18

FOREIGN PATENT DOCUMENTS

0028821  2/1986  Japan ................................. 73/861.18
0084522  4/1986  Japan ................................. 73/861.18

Primary Examiner—Charles A. Ruehl
Attorney, Agent, or Firm—Ostrolenk, Faber, Gerb & Soffen

[57] ABSTRACT

The transducers in a transit time clamp-on flowmeter are positioned relative to one another by abutting against pin stops located in selected openings of one or more rows of openings extending longitudinally along the pipe axis. A block of sound-absorbing material is fixed to the conduit surface between the spaced transducers and tends to absorb sound energy flowing in the pipe wall between the transducers and substantially improves the signal-to-noise ratio of the system.

38 Claims, 6 Drawing Sheets

MOUNTING STRUCTURE FOR TRANSDUCERS

BACKGROUND OF THE INVENTION

This invention relates to a mounting structure for mounting transducers on the surface of a fluid-containing conduit, and more particularly relates to a novel mounting structure which improves the signal-to-noise ratio of the transducer signal output and which simplifies the location of spaced transducers relative to one another.

Flowmeters which employ clamp-on transducers are well known, and are described, for example, in U.S. Pat. Nos. 4,425,803, 4,373,401, 3,987,674 and 3,869,915, each in the name of Joseph Baumoel, the disclosures of which are incorporated herein.

In flowmeters such as those described in the above patents, two spaced transducers are clamped to the outer surface of a conduit. One transducer transmits a train of pulses through the pipe or conduit wall, through the fluid and back through the pipe wall to the other transducer. The other transducer, in turn, transmits a signal through the fluid in the conduit and back to the first transducer. The difference in the time taken for sonic signals to travel first upstream and then downstream of the conduit relative to the direction of flow of fluid within the conduit is a measure of the flow velocity of the material within the conduit.

A clamping structure for holding transducers on the surface of the conduit or pipe is described in Baumoel U.S. Pat. No. 4,425,803, referred to above. When mounting such transducers, they should be located a known distance apart along the axis of the conduit, which distance depends upon the conduit material, the conduit size, and the fluid within the conduit, among other parameters. As disclosed in abovementioned U.S. Pat. No. 4,425,803, an index scale is provided on the transducer mounting track and the edges of the transducers are located at particular index numbers determined by the manufacturer and the transducers are then firmly clamped in place.

This technique requires a skilled operator who can find the correct index marking for each transducer and requires that the transducer be held firmly in place while it is being clamped at the location in which it was set on the index scale.

As will be described, the present invention provides a novel positioning means for accurately positioning transducers in predetermined axial locations along the conduit length to a high degree of accuracy by untrained persons.

It is also well known that, during the operation of spaced transducers in the reflect mode, some of the pulse energy from the transmitting transducer will propagate axially along the pipe wall toward the receiving transducer. This direct pulse reaches the receiving transducer earlier than the pulse energy which traverses the fluid. Conventionally, the receiving transducer is gated so that it receives energy only during the period that the sonic energy through the fluid could be expected to be received. Therefore, the direct pulse through the pipe is not expected to interfere with the reflect mode measurement taking place, with respect to the time of arrival of the sound traversing the fluid at the second transducer. However, while the peak energy of the initial pulse which passes through the pipe has passed long before the signal which traverses the fluid arrives at the receiving transducer, there is a "ringing" or oscillation through the pipe wall so that some energy of the direct wall pulse is received by the receiving transducer at the time the energy traversing the fluid reaches the second transducer. This residual pipe noise, while small, adversely affects the signal-to-noise ratio of the measurement. The structure of the present invention eliminates or considerably reduces the effect of energy which traverses between the transducers directly through the pipe wall when making a measurement in the reflect mode of the time taken for sonic energy to pass through the fluid within the conduit.

BRIEF DESCRIPTION OF THE INVENTION

In accordance with a first aspect of the present invention, a novel mounting structure is provided in which the two transducers are mounted between spaced rails which define a mounting track and are clamped to the rails in any desired manner. In one embodiment, the transducers are on the same mounting track and, in another, a similar mounting track for each transducer is on opposite sides of the conduit. The rails contain a series of spaced, pin-receiving openings which extend parallel to the conduit axis, and are positioned and spaced in a predetermined accurate manner. The pin openings are located at a height on the track that ensures that, if a pin is inserted perpendicular to the conduit axis and through a selected opening and into a corresponding opening on the other rail, the pin will intersect the side edge of a transducer housing to accurately locate the transducer housing at an exact location determined by the pin location. The second transducer is similarly located by abutting a pin which is inserted through an opening in a second line of openings which are parallel to the first and are axially spaced relative to the first. Therefore, an exact predetermined spacing can be easily set by untrained personnel who simply place pins in numbered and lettered sets of openings defined by a program in a flow measurement computer on the basis of, e.g., the measured properties of the liquid, or identified from a chart provided by the manufacturer which designates pairs of pin openings in terms of conduit size and liquid properties. The installer then simply places the transducer on the mounting track and moves it so that the transducers engage the pins and then tightens the clamps which fix the transducers on the mounting track or tracks and on the conduit to which the transducer must be coupled. The pins can then be removed if desired.

The function of the pins described above can be carried out by any type of insertable blocking member which need only project sufficiently into the slot receiving the transducers as to engage the transducer side and thus position it within the track.

As a second aspect of the present invention, and in order to increase the signal-to-noise ratio of the received signal when making reflect-mode measurements, a novel sonic absorbent body is fixed to the conduit wall and is disposed between the two spaced transducers. This sound-absorbent body is preferably of a material with the same or similar sonic impedance as the pipe so that sound passing through the pipe wall will more easily enter the sound-absorbing body. The sound-absorbing body can contain structure similar to that disclosed in Baumoel U.S. Pat. No. 4,556,813 in order to appropriately capture and then dissipate the energy which enters the sound-absorbing body so that this energy is not reflected back into the pipe wall. It has been found that the use of such a novel sound-absorbing body disposed on the pipe wall and located between the two spaced transducers can increase the signal-to-noise ratio by a factor between two and four.

The novel sound-absorbing block disposed between the two reflect-mode spaced transducers can be used in any transducer arrangement where it is desired to reduce the noise level of sound energy traversing directly through the pipe wall and between two spaced transducers. The sound-absorbing block is primarily useful in applications using the reflective mode of operation using a short path between transducers. Similarly, the novel mounting structure of the invention employing location pins, as described above, can be used by itself or in combination with the novel sound-absorbing block. In a third embodiment of the invention, and particularly useful for transducers operated in a direct mode, a non-rigid absorbent material such as a mastic or duct tape is fixed around the periphery of the conduit between the transducers. Any suitable viscous, highly sonically damping material can be used. It has been found that such viscous materials can increase signal-to-noise up to fivefold.

Other features and advantages of the present invention will become apparent from the following description of the invention which refers to the accompanying drawings.

DETAILED DESCRIPTION OF THE DRAWINGS

Figures 1, 4, 6:
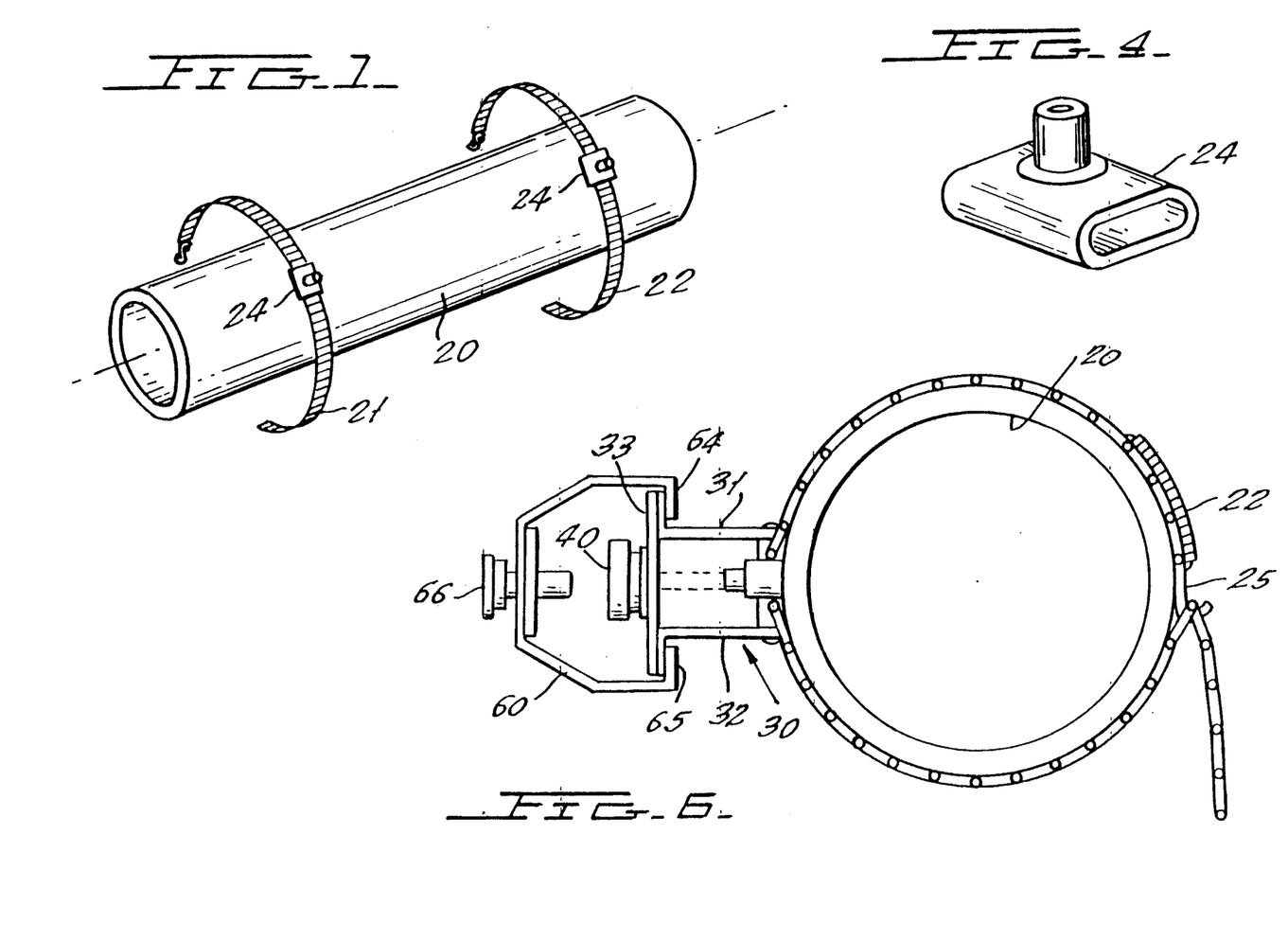
FIG. 1 is a perspective view of a conduit which has spaced mounting chains or straps before they are clamped onto its surface.
FIG. 4 is a perspective view of a track-mounting nut for connecting the chains of FIG. 1 to the track of FIG. 2.
FIG. 6 is an end view of FIG. 5.

Referring first to FIG. 1, there is shown a hollow conduit or pipe 20 having a flow axis within which any desired fluid may translate or be contained. Pipe 20 may be of steel or any other material suitable for use with clamp-on transducers and may typically have an inner diameter from ½ inch to 240 inches, although there is no limit on diameter. The pipe wall can have any thickness. The purpose of one aspect of the present invention is to secure flow-monitoring transducers to the surface of the conduit and to permit the accurate location of the transducers relative to one another along the axis of the conduit 20.

Before the installation procedure, the pipe may if desired be abraded to have a flat about ⅛ inch wide extending parallel to the axis of the pipe. All grit, corrosion, coatings or loose paint is removed from the pipe surface and it is cleaned and degreased. The location chosen for the mounting of the transducers is one which remains full at zero flow and which is located preferably away from pipe bends and on a straight run of the pipe.

Each of a pair of conventional mounting chains or straps 21 and 22 receives a respective track-mounting nut such as the track-mounting nut 24 of FIG. 4. Chains or straps 21 and 22 are then wrapped around and are fastened by respective chain hooks 25 of FIG. 6. An adjustment screw of conventional variety (shown in FIG. 12) permits tightening of the chain, as desired. The chains 21 and 22 and the track-mounting nuts which they carry permit the fixing of a mounting track 30 of FIGS. 2 and 3 to pipe 20.

Figure 2:
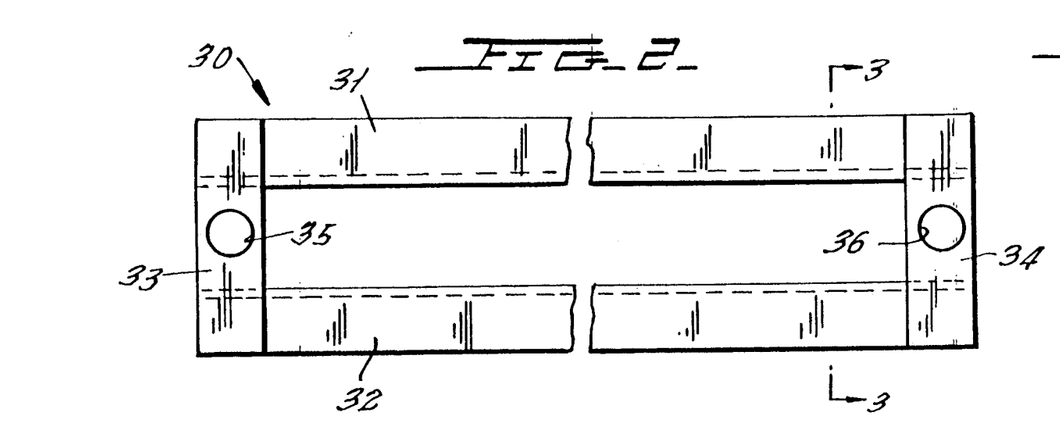
FIG. 2 is a plan view of a mounting track which can be employed with the present invention.
Figure 3:
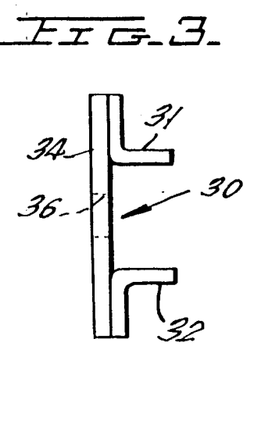
FIG. 3 is an end view of the mounting track of FIG. 2.

The mounting track 30, as shown in FIG. 2, may consist of a pair of parallel-spaced steel or aluminum angles or rails 31 and 32. Rails 31 and 32 are fixed relative to one another by a pair of cross pieces 33 and 34 which are riveted or welded to the opposite respective ends of the rails 31 and 32. Cross pieces 33 and 34 have respective central openings 35 and 36 which are best seen in FIG. 2.

Figure 5:
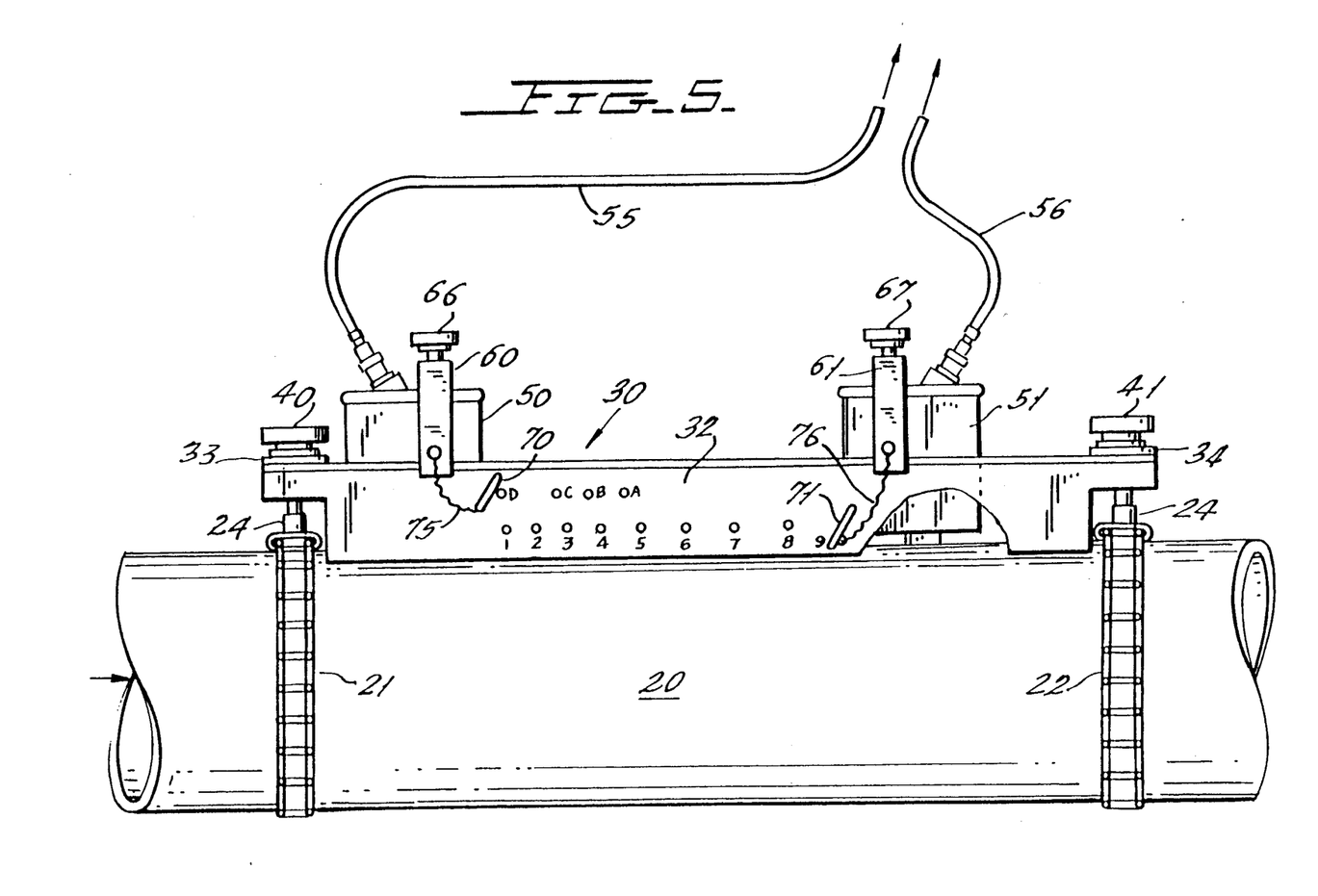
FIG. 5 is an elevation view of a conduit having a mounting track and two transducers mounted thereon, and stop location pins for locating the transducers relative to one another for a reflective mode of operation.

As best shown in FIG. 5, rail 32 is provided with an upper row of four spaced openings labeled A, B, C and D, respectively, and a lower row of up to 16 spaced openings labeled for example 0 through 15, or a selected subset such as 0 through 8 as shown, for shorter tracks. Each of the rows of openings is parallel to the axis of conduit 20.

A plurality of corresponding rows of openings (not shown) is in line with and disposed on rail 32. Therefore, a pin can be inserted perpendicularly to rail 32 through any one of the openings into a corresponding opening in the other rail. Openings A through D and 1 through 9 in the two rails 32 and 31 are located at predetermined positions relative to one another to correspond to a menu or predetermined list of transducer locations for various pipe sizes and material. Thus, when the transducer assembly is provided to the user, the flow measurement and display computer determines which openings are to be selected for the specific application. The exact spacings used will depend in part on the nature of the transducers used and can be easily defined by the manufacturer for different conduits and liquids monitored.

The rail assembly 30 is fixed to the conduit 20 by the chains 21 and 22 and by track mounting screws 40 and 41 which pass through openings 35 and 36, respectively, in cross bars 33 and 34, respectively. Screws 40 and 41 are threaded into the threaded interior openings of track mounting nuts 24 which are fixed to the pipe wall 20 by the chains 21 and 22. Consequently, by tightening screws 40 and 41, the rail 30 is fixed to pipe wall 20.

The transducers are next clamped to the track 30 so that the operative face of the transducers is physically pressed into contact with the outer surface of the pipe wall 20 when screws 40 and 41 are tightened. More specifically, and as is shown best in FIG. 5, transducers 50 and 51 are fitted between the spaced rails 31 and 32 of track 30. Each transducer may have the shape shown in FIG. 7 and will have an active bottom surface which can receive a suitable sonic coupling compound 53 before it is inserted in the track 30 and applied against the pipe wall 20. Transducers 50 and 51 have appropriate electrical cables 55 and 56, respectively, extending therefrom and which carry the electrical signals which may be processed in accordance with the description of U.S. Pat. No. 3,987,674, referred to above, or by any other desired known processing technique.

Transducers 50 and 51 are secured to rail assembly 30 by respective clamps 60 and 61 which may be of sheet steel bent to shape, as shown in FIG. 6. Thus, each of clamps 60 and 61 has inwardly projecting flanges 64 and 65, respectively, of FIG. 6, which hook beneath rails 31 and 32, respectively. Each of the clamps contains pressure screws 66 and 67, respectively (FIG. 5). By tightening screws 66 and 67 against the upper surface of transducers 50 and 51, it is possible to forcibly press the bottom surfaces of transducers 50 and 51 into good coupling relationship with the wall of the pipe 20. The bottom and body of rails 31 and 32 may be lifted from conduit 20 when the transducers 50 and 51 are pressed against conduit 20.

In accordance with the invention, two index pins 70 and 71, shown in FIG. 5, extend into opening D in the top row of openings and pin 71 extends into opening 9 in the bottom row.

Figure 8:
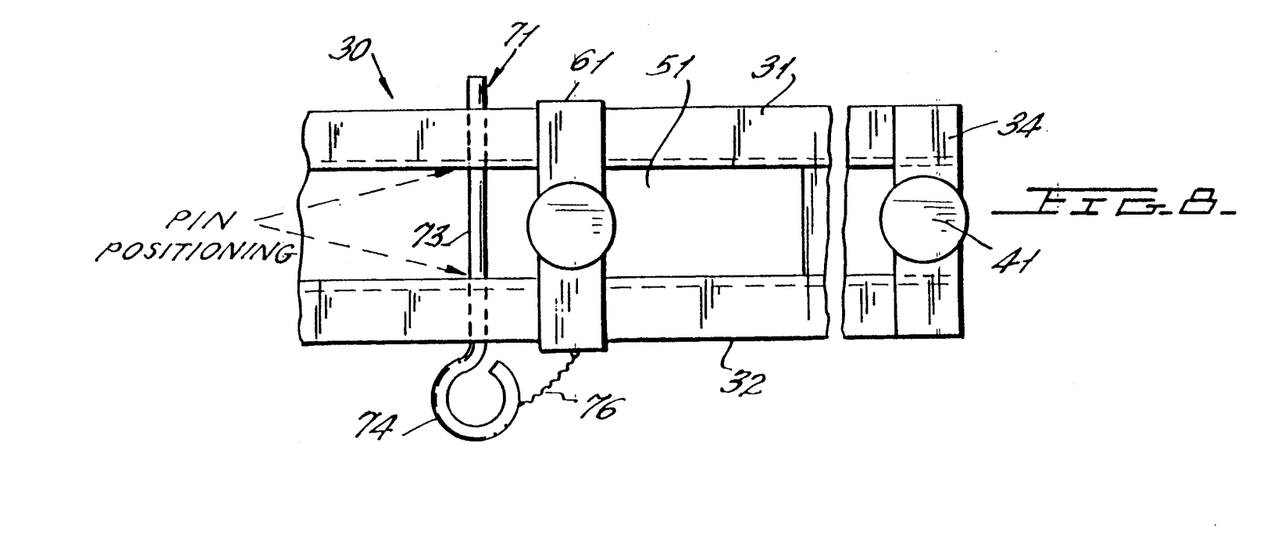
FIG. 8 is a top view of a portion of FIG. 5 and shows one of the transducers of FIG. 5 and its stop pin.

The index pin 71 is shown in detail in FIG. 8 and has an extending shank 73 and a finger loop 74 for inserting the pin and for removing it in a convenient fashion. Each index pin 70 and 71 can be connected to its respective transducer clamp 60 and 61 by chains 75 and 76, respectively, to prevent accidental loss of the pins.

Figures 5A, 7, 9:
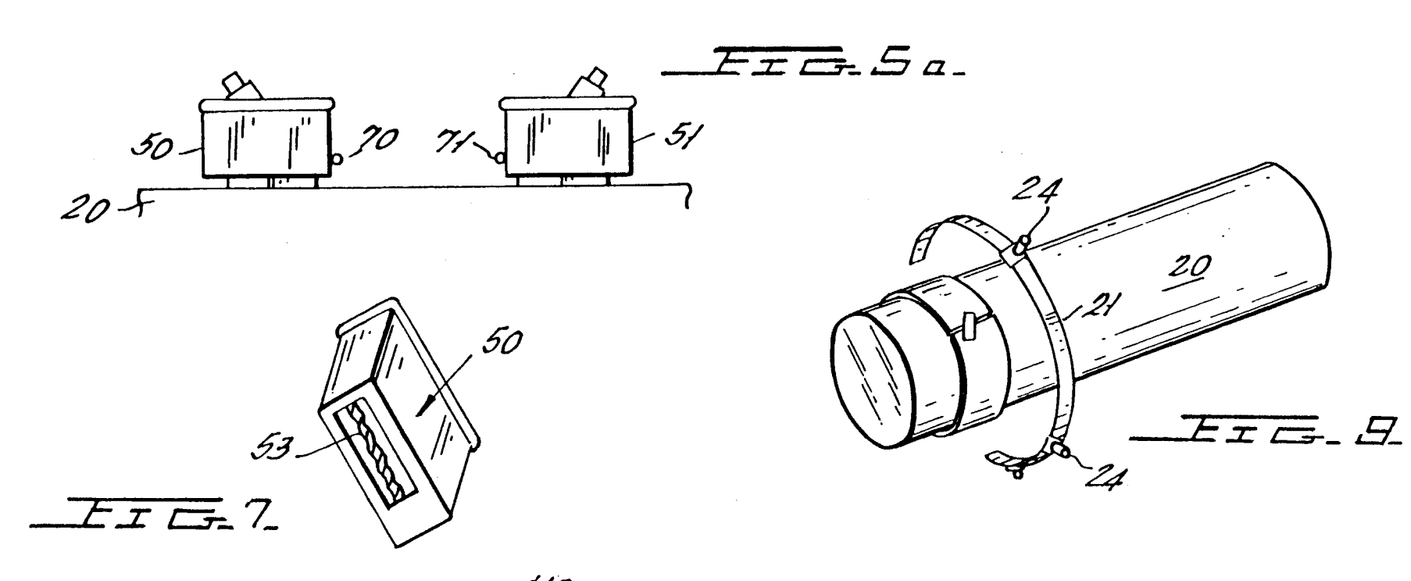
FIG. 5a schematically shows the location of the stop pins and their respective transducers in the arrangement of FIG. 5.
FIG. 7 is a perspective view from the bottom of one of the transducers of FIG. 5.
FIG. 9 shows a second embodiment of the invention before two transducers are mounted on opposite sides of a conduit for a direct operation mode.

In order to install the transducers 50 and 51 with a predetermined spacing between them for a given application, the installer will know as previously described which openings in the rows of openings must be selected for pins 70 and 71 for his particular installation. Such pin settings may be provided by the manufacturer or can be calculated by the built-in computer supplied with such equipment. The particular spacings used will vary for equipment of different manufacturers and using different operation modes. After identifying the openings, pins 70 and 71 are placed in their appropriate identified opening. Transducer 50 and transducer 51 are then simply laterally moved toward one another along the track 30 until the sides of the transducers engage their respective pin as is best shown in FIG. 5a and as shown for the transducer 51 engaging pin 71 in FIG. 8. The installer then tightens the screws 66 and 67 to fix the transducer positions. Pins 70 and 71 may then be removed, if desired.

While pins 70 and 71 are shown extending between both rails 31 and 32, the pin need only extend through a single location opening in one rail and only at least partly into the slot defined between rails 31 and 32.

FIGS. 9 through 13 show a second embodiment of the invention wherein the transducers are mounted on opposite sides of the conduit for a direct operation mode instead of on the same side for a reflective operation mode as is shown in FIG. 5. In FIGS. 9 through 13, components which are the same as or similar to those of FIGS. 1 through 8 have been given similar identifying numerals. It will be noted that in FIG. 12 a pair of track assemblies 30 is secured to the opposite lateral sides of the pipe 20. It is preferred that the transducers be mounted in a horizontal plane relative to the ground in both the embodiment of FIGS. 1 through 8 and in the embodiment of FIGS. 9 through 13 so that sediment on the bottom of the pipe does not interfere with the transmission of sonic energy through the interior of the conduit.

Figures 12, 13:
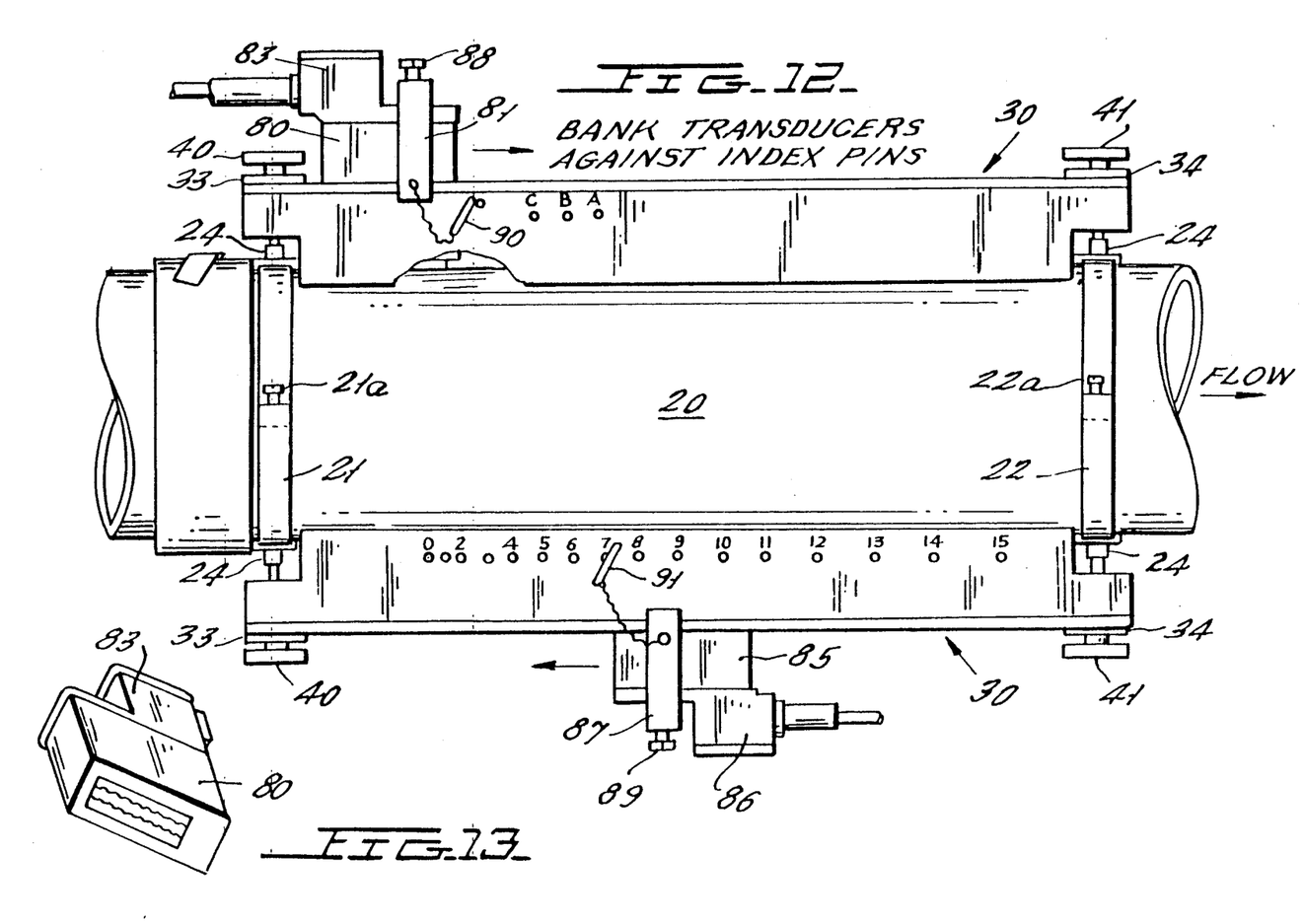
FIG. 12 is an elevation view of the novel mounting track fixed to the conduit of FIGS. 9, 10 and 11, with adjustment pins precisely locating the spaced transducers relative to one another in a longitudinal direction parallel to the axis of the conduit.
FIG. 13 shows a bottom perspective view of one of the transducers of FIG. 12.

The index openings in tracks 30 in FIG. 12, however, differ from those of FIG. 5 since only a single row of index openings need be contained in each of the two track assemblies. Thus, in FIG. 12, only index openings A, B, C and D are formed in the upper rail whereas a row of index openings 0 through 15 appear in the lower track assembly. When upper and lower tracks 30 in FIG. 5 (which are, in fact, in a common horizontal plane) are laterally aligned, the spacing between selected openings in rows A to D and 0 to 15 is well defined.

Figure 10:
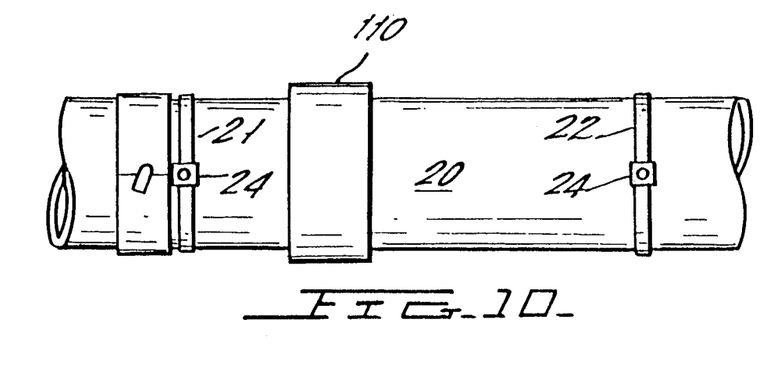
FIG. 10 is a plan view of the conduit of FIG. 9 after mounting chains have been secured in position.
Figure 11:
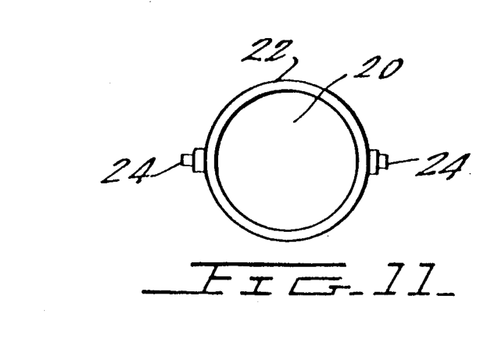
FIG. 11 is an end view of FIG. 10.

In mounting transducers as in FIG. 12, a pair of chains is first assembled as shown in FIGS. 9, 10 and 11. Thus, chains 21 and 22 in FIG. 10 will have pairs of track-mounting nuts 24 fitted thereon and located exactly 180° apart from one another. FIG. 9 shows chain 21 before it is secured in place. The upper rail 30 of FIG. 12 is mounted on the upper set of spaced nuts 24 on chains 21 and 22. Similarly, the lower rail 30 is fixed to the lower set of spaced nuts 24, as shown in FIG. 12. FIG. 12 also shows the strap-tension adjustment screws 21a and 22a for the straps 21 and 22, respectively.

A single transducer 80 is then disposed between the spaced rails of upper track 30 and is mounted to the track 30 by the strap or clamp 81 as shown in FIG. 12. The transducer 80 is also shown in perspective view in FIG. 13. Note that a transducer wiring housing 83 is fixed atop the transducer 80 and that an appropriate wiring cable extends therefrom which is to be connected to the control circuitry for driving the transducer assembly.

A similar arrangement is provided at the bottom of FIG. 12 for the track containing second transducer 85. Transducer 85 has a wiring assembly 86 connected thereto, and is fixed to the track 30 by the clamp 87. Clamps 81 and 87 and their mounting screws 88 and 89, respectively, may be identical in construction to those of FIGS. 5, 6 and 8.

In accordance with the invention, pins 90 and 91, each of which may be identical to the index pin 72 of FIG. 8, are then appropriately located by the installer in openings D for the upper track 30 and 7 for the lower track 30, or any of the other pin openings which have been identified to the user for his particular assembly. The transducers 80 and 85 are abutted or "banked" against their respective pins 90 and 91 and screws 88 and 89 are then tightened. In this way, the transducers 80 and 85 have the preferred spacing between them for a particular installation.

Figure 14:
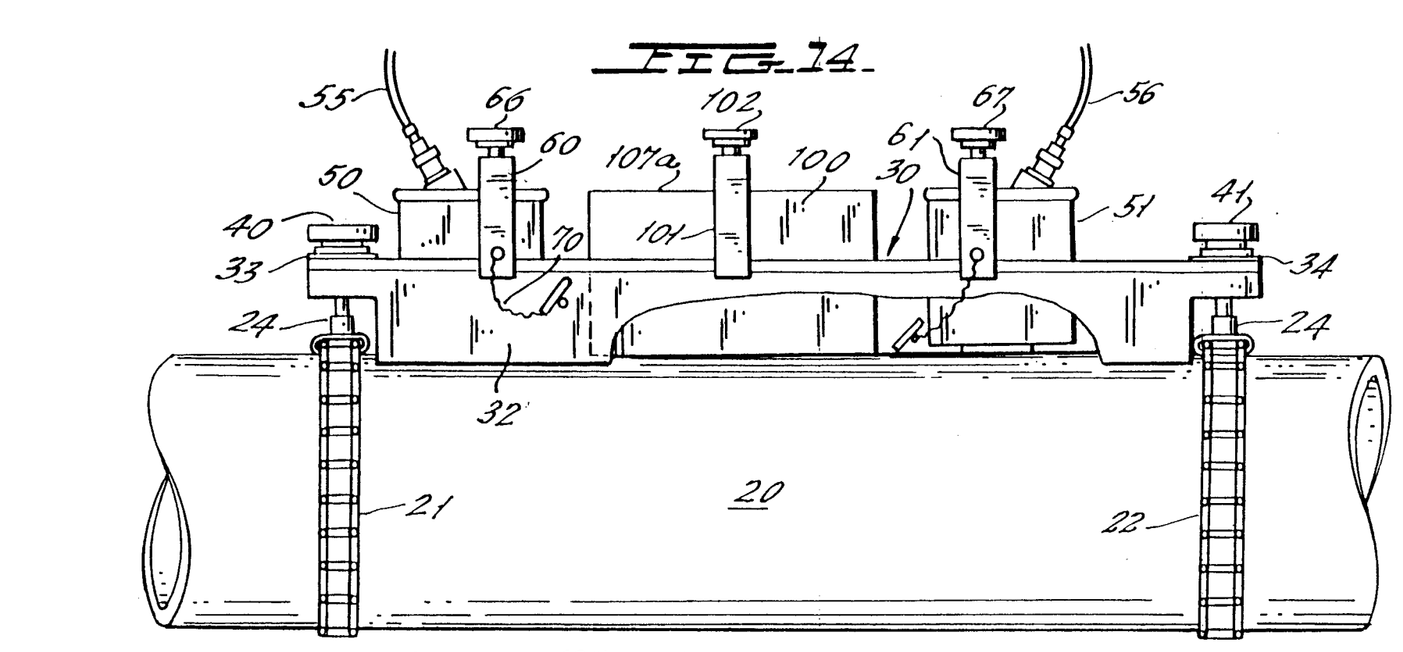
FIG. 14 shows a further embodiment of the present invention in which a structure similar to that shown in FIG. 5 has a novel sound-absorption block fixed to the conduit and disposed between the spaced transducers.
Figure 15:
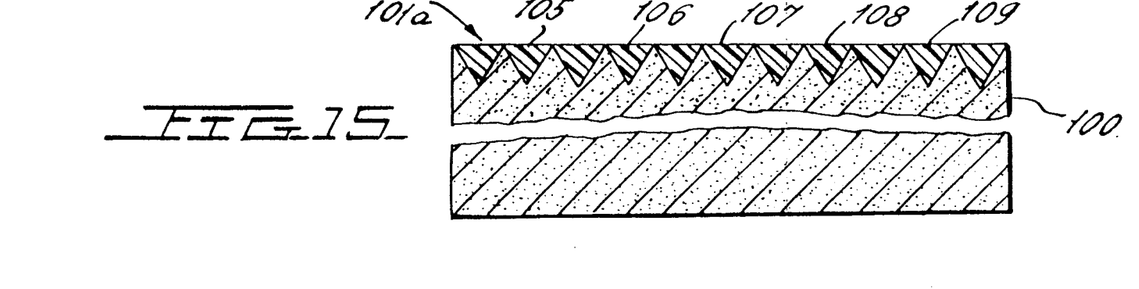
FIG. 15 is a cross-sectional view of the novel sound-absorption block of FIG. 14.

FIGS. 14 and 15 show a further embodiment of the invention wherein a sound-absorption block 100 is installed on the conduit 20 of FIG. 5 and is disposed between transducers 50 and 51. During the operation of transducers 50 and 51, a sonic energy pulse is initiated, for example, by transducer 51. It is intended that the energy of this pulse will enter and be refracted through the fluid flowing in the conduit 20. The energy is then reflected off the rear interior pipe wall and then into the receiving transducer 51. In a similar manner, a pulse transmitted by transducer 51 through the fluid within the conduit 20 will be received by transducer 50. The circuitry connected to these transducers will measure the transit time of pulses going upstream and downstream between the transducers 50 and 51. The time difference between the upstream time and downstream time will be a measure of flow velocity of fluid within conduit 20. It is desirable that the measurements be as free as possible from extraneous sonic and electronic noise. However, it is well known that the output pulse of transducers 50 and 51 travels not only through the fluid in the conduit 20, but also travels longitudinally along the pipe wall. The transit time for a pulse, for example, from transducer 50 to transducer 51, is short compared to the time taken for energy to traverse through the fluid and, therefore, should not interfere with the measurement of the later arriving sonic energy. As a practical matter, however, the energy transmitted through the pipe wall has a relatively long ring-down or oscillation time such that some directly transmitted sonic energy will be received by the receiving transducer at the time the energy through the fluid is received by that same transducer. This has an adverse effect on the signal-to-noise ratio of the system.

In accordance with the present invention, block 100 is fixed to the pipe 20 and is arranged to accept sonic energy directly transmitted down the wall of pipe 20. Block 100 extends longitudinally along the pipe wall and is between transducers 50 and 51. Preferably, the block 100 has a similar height and width as transducers 50 and 51. It is mounted within the track 30 by an appropriate clamp 101 and mounting screw 102 so that the block 100 is firmly connected to the exterior surface of pipe 20. A suitable coupling compound may be placed between the bottom surface of block 100 and the pipe wall 20. Block 100 is also provided with appropriate means to attenuate and scatter sonic energy once it enters the block 100 from the pipe wall 20 and to prevent its reflection back into the pipe 20. By way of example, the block 100 may have holes filled with metal or plastic powder particles suspended in a suitable viscous compound which serve as scattering and absorbing centers for sound energy received into the block 100. The top surface 101a of block 100, as shown in FIG. 15, may also contain a plurality of triangular or conical openings, such as the conical openings 105 through 109 which may be filled with any desired absorptive material such as an elastomer or the like. These will absorb or scatter sonic energy which reaches the top surface and will not reflect such energy.

In its longitudinal dimension, the block 100 should not contact either of transducer bodies 50 or 51 and a gap should exist between the side edges of block 100 and the transducers. The gap dimension is not critical.

It has been found that the block 100 can improve signal-to-noise ratio by two to four times. It will be understood that the novel sound-absorbing block 100 of FIGS. 14 and 15 can be employed in any desired arrangement in which spaced transducers communicate with one another within or on or along the surface of a pipe in either a longitudinal or peripheral direction and wherein it is desired to remove or reduce the effect of direct communication of the transducers through the pipe wall.

FIG. 10 discloses a further embodiment of the invention wherein a viscous body 110 is shown as enclosing and contacting the outer surface of conduit 20 in the region between transducers 80 and 85 of FIG. 12. It has been found that body 110 will cause substantial damping of the sonic energy which may pass through the pipe wall and between transducers 80 and 85 in the direct mode of operation. Body 110 can, for example, consist of a layer of duct tape applied on conduit 20 between the tracks and as long as the length of the tracks. Signal-to-noise improvements of 5 to 1 have been obtained with such viscous body damping.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mounting track for a transducer; said mounting track comprising a pair of spaced elongated rails defining an elongated transducer-receiving slot; at least one of said rails having at least one row of a plurality of spaced openings extending therethrough for receiving an elongated stop member which extends at least partly into said slot, whereby a stop member disposed through one of said openings and extending at least partly into said slot serves as a stop to accurately locate the position of a transducer longitudinally within said slot.

2. The mounting track of claim 1 which further includes a second row of a plurality of spaced openings which is parallel to but spaced from said at least one row of openings, whereby first and second stop members extending through selected openings in said at least one row and said second row of openings serve as stops to accurately locate the position of first and second transducers within said slot and relative to one another.

3. The mounting track of claim 2 wherein both of said rails have a second row of spaced openings which is parallel to but spaced from said at least first row of openings, and wherein said stop members are pins which extend perpendicularly across said slot and between aligned ones of said openings in said at least one row of openings and said second rows of openings.

4. The mounting track of claim 3 wherein said stop members are removably located in said slot.

5. The mounting track of claim 2 wherein said stop members are removably located in said slot.

6. The mounting track of claim 1 wherein both of said rails have at least first aligned rows of spaced openings and wherein said stop member is a pin which extends perpendicularly across said slot and between aligned ones of said rows of at least first openings.

7. The mounting track of claim 6 wherein said stop member is removably located in said slot.

8. The mounting track of claim 1 wherein said stop member is removably located in said slot.

9. In combination, a transducer to be clamped to the surface of a fluid-containing conduit, a mounting track for receiving said transducer, means for connecting said mounting track to said conduit, a clamp for clamping said transducer to said mounting track, and means for locating said transducer at a predetermined longitudinal location along said mounting track; said mounting track comprising a pair of spaced elongated rails defining an elongated slot; at least one of said rails having at least one row of a plurality of spaced openings therethrough; said means for locating said transducer comprising a stop member disposed through any one of said openings and into said slot; said transducer being disposed within said slot and being clamped by said clamping means in a longitudinal position within said slot with one side thereof abutting the location of said stop means in said slot; said means for connecting said mounting track to said transducer pressing the face of said transducer against the surface of said conduit.

10. The transducer of claim 9 wherein said at least said one rail of said mounting track contains a second row of openings which is parallel to but spaced from said at least one row of openings; a second stop member disposed through one of said openings of said second row of openings and at least partly into said slot; and a second transducer being disposed within said slot in a longitudinal position displaced from that of said first-mentioned transducer and with one side thereof abutting the location of said second stop means within said slot, and second clamping means for clamping said second transducer to said mounting track whereby said transducers are spaced by a distance related to the space between said openings which receive said stop means.

11. The combination of claim 10 wherein each of said stop members comprises a pin which extends perpendicularly across said slot.

12. The combination of claim 10 wherein each of said stop members is removably located in said slot.

13. The combination of claim 10 which further includes a sonic energy-absorbing means which is disposed within said slot and is positioned between and spaced from said transducers and is clamped to said mounting track and has a face thereof which is pressed against the surface of said conduit.

14. The combination of claim 13 wherein said sonic energy-absorbing means comprises a body having a sonic impedance which is matched to the sonic impedance of the wall of said conduit.

15. The combination of claim 14 wherein said sonic energy-absorbing means is a block of material having sonic energy damping means therein whereby sonic energy entering said block is substantially dissipated therein.

16. The process of claim 14, wherein said sonic-energy absorbing means comprises a viscous sonic-damping means.

17. The process of claim 16, wherein said viscous means comprises a flexible tape.

18. The process of claim 16, wherein said viscous means comprises duct tape.

19. The process of claim 16, wherein said viscous means comprises a mastic.

20. The combination of claim 9 wherein said stop member comprises an elongated pin which extends perpendicularly across said slot.

21. The combination of claim 9 wherein said stop member is removably located in said slot.

22. The process of mounting a transducer on a conduit comprising the insertion of a transducer into an elongated slot in a mounting track, inserting a pin perpendicularly into said slot through a selected one of a row of openings which extends along said slot, moving said transducer to a position at which its side abuts said pin and then clamping the transducer at that location within said slot and fastening said mounting track to said conduit with an active surface of said transducer firmly pressed against the surface of said conduit.

23. The process of claim 22 wherein said pin is removed after said transducer is clamped to said track.

24. The process of claim 22 which further includes the mounting of a second transducer in said slot, and inserting a second pin perpendicularly into said slot through a selected one of a second row of openings which extends parallel to said row of openings, and moving said second transducer to a position at which its side abuts said second pin, and then clamping said second transducer at that location within said slot with an active surface of both of said transducers firmly pressed against the surface of said conduit.

25. The process of claim 24 wherein said pins are removed after said transducers are clamped to said track.

26. The process of claim 24, wherein said mounting track is mounted to said conduit after said first-mentioned transducer is mounted in said slot in said mounting track.

27. The process of claim 22, wherein said mounting track is mounted to said conduit after said first-mentioned transducer is mounted in said slot in said mounting track.

28. An ultrasonic measuring system for determining a condition of a fluid within a conduit; said system comprising first and second transducers spaced from one another along a predetermined length of said conduit and operable to transmit ultrasonic energy at least from said first to said second transducer and through the fluid within said conduit and to determine said condition at least in part from the energy received by said second transducer; and a sonic energy-absorbing means fixed to said conduit at a location between said first and second transducers and operable to accept and disperse ultrasonic energy which propagates through the wall of said conduit from said first to said second transducer; and wherein said first and second transducers are disposed on opposite sides of said conduit and wherein said sonic energy-absorbing means comprises a viscous sonic-damping means.

29. The system of claim 31 wherein said sonic energy-absorbing means comprises a body having a sonic impedance which is matched to the sonic impedance of said conduit wall.

30. The system of claim 29 wherein said sonic energy-absorbing means is a block of material having sonic energy damping means therein whereby sonic energy entering said block is substantially dissipated therein.

31. The system of claim 28 wherein said transducers and said absorbing means are clamped to the outer surface of said conduit.

32. The system of claim 31 wherein said transducers are longitudinally spaced from one another along the axis of said conduit.

33. The system of claim 32 wherein said sonic energy-absorbing means comprises a body having a sonic impedance which is matched to the sonic impedance of said conduit wall.

34. The system of claim 31 wherein said sonic energy-absorbing means comprises a body having a sonic impedance which is matched to the sonic impedance of said conduit wall.

35. The system of claim 28 wherein said first and second transducers are disposed on the same side of said conduit.

36. The system of claim 28 wherein said viscous means comprises a flexible tape.

37. The system of claim 28 wherein said viscous means comprises duct tape.

38. The system of claim 28 wherein said viscous means comprises a mastic.

* * * * *